United States Patent [19]

Madrid et al.

[11] Patent Number: 5,832,779
[45] Date of Patent: Nov. 10, 1998

[54] ACTUATOR ASSEMBLY WITH MANUAL LOCKING DEVICE

[75] Inventors: Ronn G. Madrid, Midland; Don Hiller, Longview, both of Tex.

[73] Assignee: Dresser Industries, Inc., Dallas, Tex.

[21] Appl. No.: 819,761

[22] Filed: Apr. 3, 1997

[51] Int. Cl.[6] .............................. F16H 1/18; F16H 17/14
[52] U.S. Cl. ................................... 74/424.8 VA; 137/72; 74/2
[58] Field of Search ........................... 74/424.8 VA, 532, 74/527, 2; 337/1, 2, 4, 12, 14, 22; 200/61.8; 185/60 R; 137/72, 75, 79; 251/129.11, 148, 129.17

[56] References Cited

U.S. PATENT DOCUMENTS

| | | | |
|---|---|---|---|
| 2,978,911 | 4/1961 | Haessler | 74/2 |
| 4,183,371 | 1/1980 | Slawson | 74/2 X |
| 4,273,307 | 6/1981 | Malinski et al. | |
| 4,325,534 | 4/1982 | Roarke et al. | 74/424.8 VA |
| 4,469,119 | 9/1984 | Snyder et al. | 137/72 |
| 4,624,285 | 11/1986 | Perach | 251/129.17 |
| 4,660,428 | 4/1987 | Payne | |
| 4,691,893 | 9/1987 | Akkerman et al. | |
| 4,741,508 | 5/1988 | Fukamachi | |
| 4,920,811 | 5/1990 | Hopper | |
| 4,960,261 | 10/1990 | Scott et al. | 251/148 |
| 5,195,721 | 3/1993 | Akkerman | |
| 5,291,919 | 3/1994 | Calzavara | 74/424.8 VA |

*Primary Examiner*—Charles A. Marmor
*Assistant Examiner*—Marcus Charles
*Attorney, Agent, or Firm*—Haynes and Boone, L.L.P.

[57] ABSTRACT

An actuator assembly for moving a member, such as a gate valve, or the like, between a retracted and extended position, and a locking device for locking the member in its extended position. A ball screw is connected to the member to be moved and is in threaded engagement with a ball nut so that, upon rotation of the ball nut, the ball screw, and therefore the member, moves between a retracted and an extended position. A gear train is connect able between a power source and the ball nut for transferring torque therebetween to rotate the nut member. The locking device cooperates with the actuator for quickly and easily locking the ball screw in an extended position at any time without requiring it to be retracted and then extended, and includes a plunger that moves axially in a housing in response to movement of the ball screw. The plunger has a reduced dimension portion, and a stem is provided that has a reduced dimension portion and a regular dimension portion. The stem is movable in the housing to a first position in which its reduced dimension portion aligns with the reduced dimension portion of the plunger to permit movement of the plunger, and therefore the member, from the predetermined position. The stem is also movable to a second position in which its regular dimension portion aligns with the necked-down portion of the plunger so that the regular dimension portion of the plunger overlaps, and is blocked by, the corresponding regular-dimension of the stem to lock the plunger, and therefore the member, in the predetermined position.

16 Claims, 6 Drawing Sheets

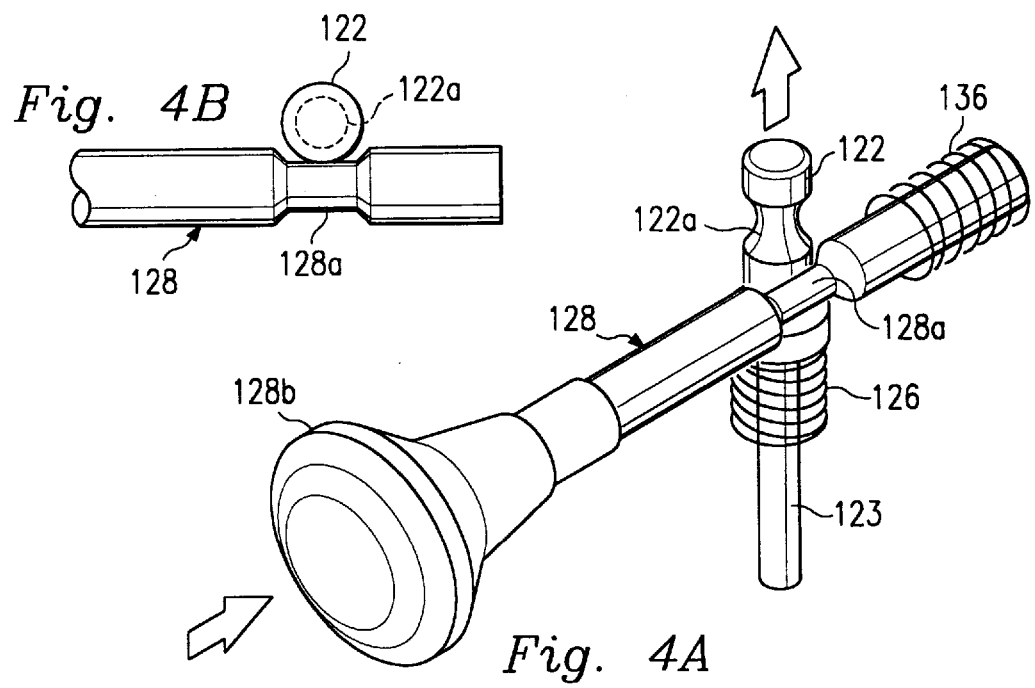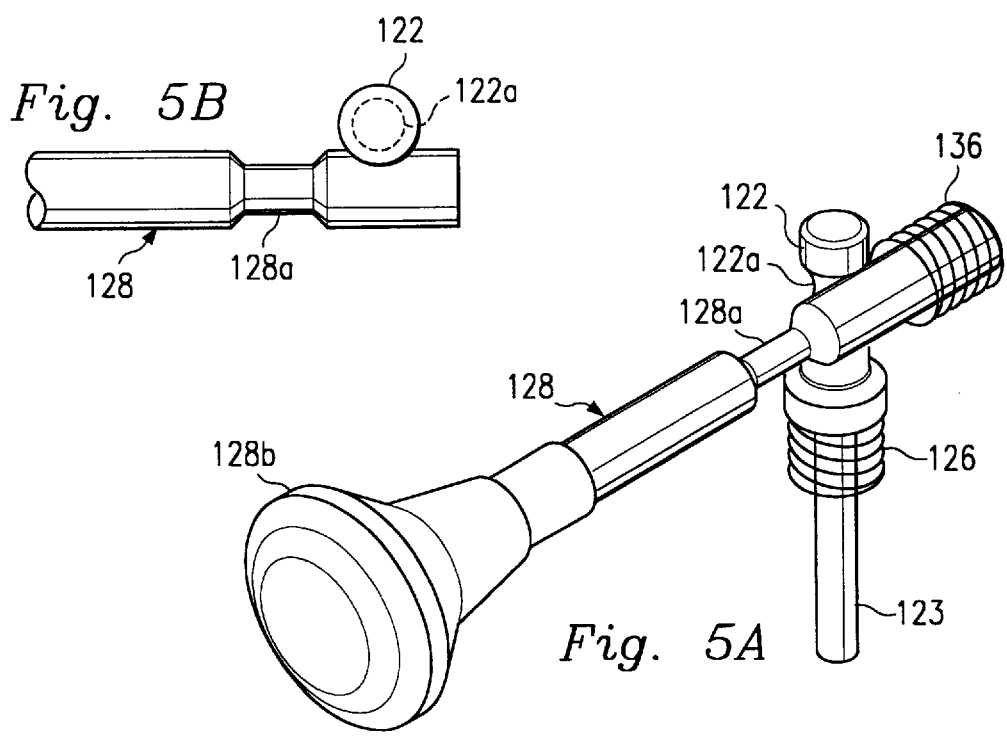

ACTUATOR ASSEMBLY WITH MANUAL LOCKING DEVICE

BACKGROUND OF THE INVENTION

The present invention relates to an actuator assembly and, more particularly, to such an assembly which provides translational movement of a ball screw between an extended and a retracted position, and a manual locking device for locking the ball screw in an extended position.

Actuators, in which a helically grooved ball screw is mounted for reciprocal axial movement in a ball nut, are used in many environments in which translational movement of a device is desired. The ball nut is secured against axial movement and is rotated to cause corresponding axial movement of the ball screw to an extended position. Actuators are used with many devices, such as, for example, gate valves or the like, which are attached to the ball screw for translational movement therewith. The ball nut can be rotated by any power source such as a hydraulic motor, an electrical motor or in any other conventional manner.

In some of these systems, an inner race is driven, via a reduction gearing system, by the power source and is coupled to a driver by a wrap spring which functions as a clutch. The driver is connected, by a gear and pinion, to the ball nut for rotating same. A low power, electrical activating device, such as an electrical solenoid, or switch, is usually provided which, when activated by a relatively low power signal, engages a control device that latches to the driver and therefore couples the driver to the inner race by causing the wrap spring to couple the inner race to the driver. This, in turn, causes the ball nut to rotate and the ball screw to extend from the ball nut and move to its fully extended position.

When it is desired to retract the ball screw, the electrical activating device is deactivated, causing the control device to release the wrap spring from its coupled position and thus release the connection between the rotating inner race and the driver. A helical spring is provided which is compressed during the above extended position of the ball screw and which urges the ball screw back to its retracted position when the above connection between the inner race and the driver is released.

In certain circumstances, it is desirable to be able to maintain the ball screw in an extended position even when the electrical activating device is shut off, either by design, or due to a power failure. One known technique to achieve this involves the removal of the electrical activating device and screwing in a plug that engages the control module and allows the actuator to open the ball screw, but not close it. This technique requires retracting, and then extending, the ball screw and is time-consuming and costly. Also, when placed in a locking position, the plug maintains the ball screw in its extended position, even under emergency conditions, such as a fire, or the like, when retraction of the ball screw is absolutely necessary.

Therefore, what is needed is an actuator assembly and a locking device for same in which the ball screw can be locked in any extended position at any time without requiring it to be retracted and then extended. Also needed is an actuator assembly and a locking device of the above type which responds to elevated temperature conditions and permits release the ball screw from its extended position.

SUMMARY

Accordingly, the locking device of the present invention is for the purpose of locking a movable member in a predetermined position and includes a housing that receives a plunger that is mounted for axial movement in the housing in response to movement of the member. A stem is also movable in the housing to a first position in which it engages the plunger to lock the plunger, and therefore the member, in the predetermined position. The stem is also movable to a second position in which axial movement of the plunger, and therefore the member, is permitted. A lever is provided that engages the stem to maintain it in its first position, the lever being meltable in response to a predetermined ambient temperature to permit release of the stem and movement of the stem to the second position.

The locking device and the actuator assembly of the present invention enjoy the major advantage of enabling the movable member, which, in the case of the actuator assembly, is the ball screw, to be easily and quickly locked in any extended position at any time without the need for attaching a plug, or the like. Also, the locking device of the present invention responds to elevated temperature conditions and permits the ball screw to be released from its extended position.

BRIEF DESCRIPTION OF THE DRAWINGS

FIGS. 4A, 4B, 5A and 5B are perspective views showing two components of the locking device of FIGS. 3A–3C in different operational modes.

DESCRIPTION OF THE PREFERRED EMBODIMENT

Figure 1:
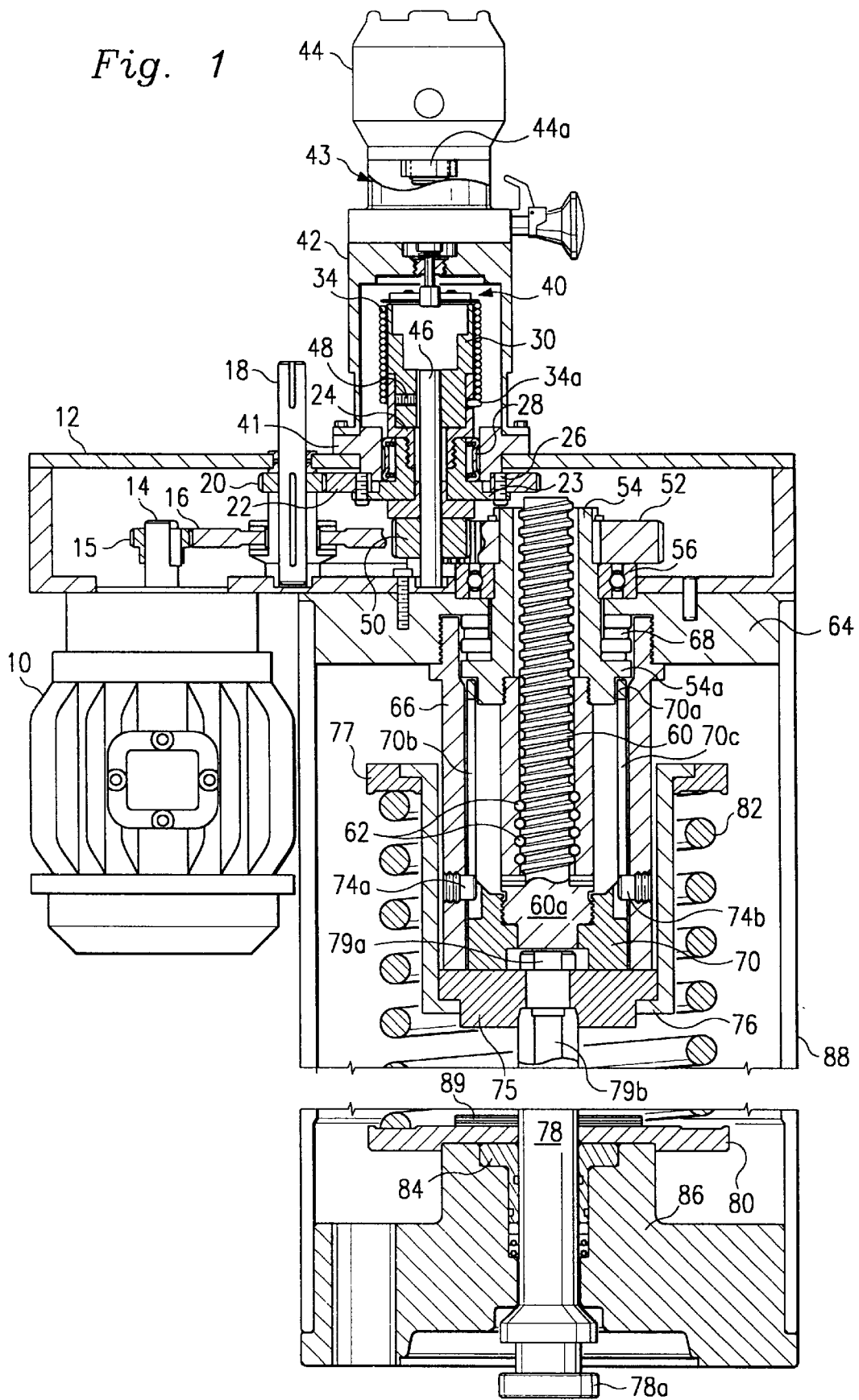
FIG. 1 is a vertical sectional view of the actuator according to an embodiment of the present invention shown with its ball screw in a retracted position.
Figure 2:
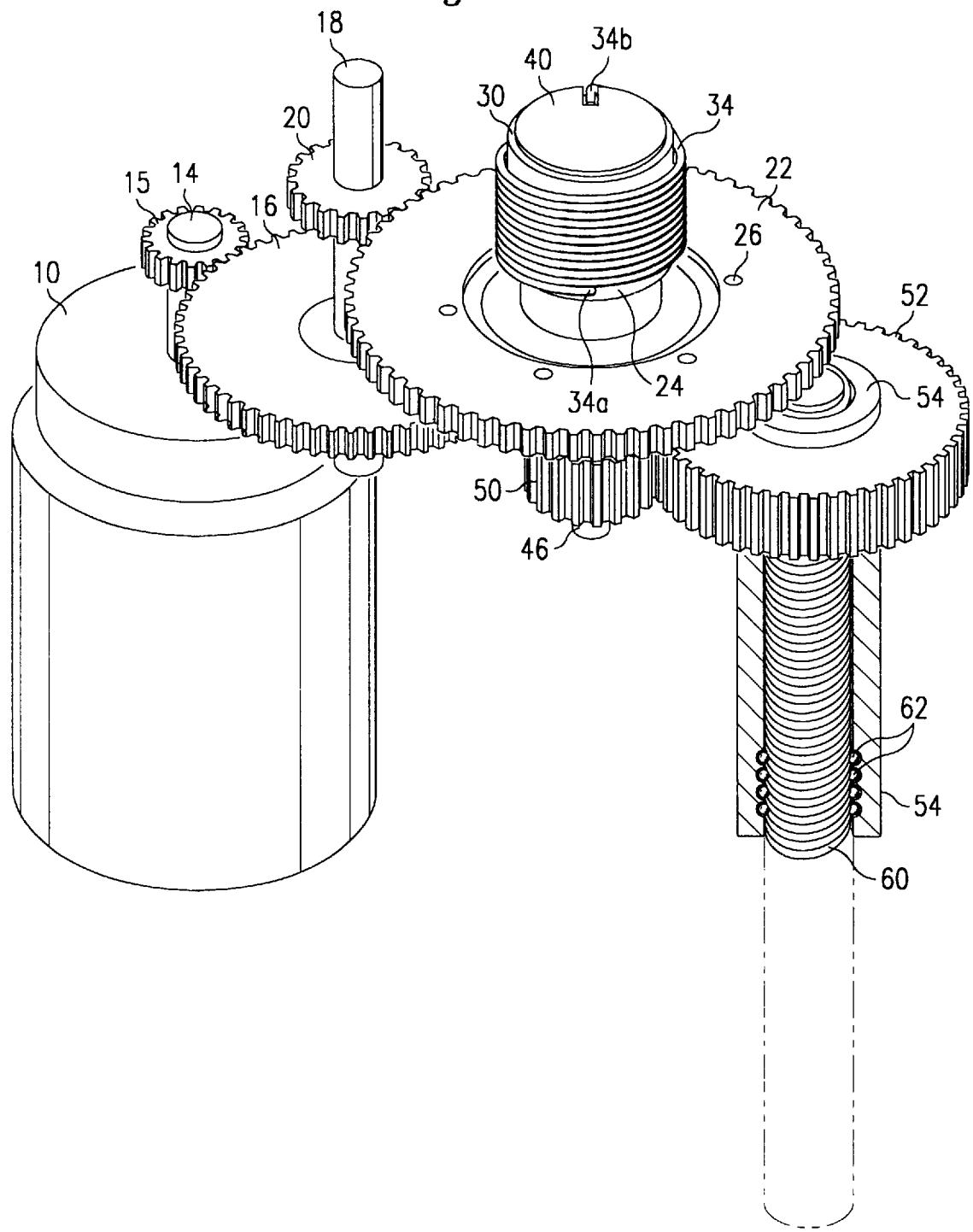
FIG. 2 is an exploded, enlarged isometric view of several components of the actuator of FIG. 1.

Referring to FIGS. 1 and 2 of the drawing, the locking device of the present invention will be shown and described in connection with an actuator assembly which includes a power source, shown in general by the reference numeral 10. The power source 10 is, for the purpose of example, an AC motor which is connected in any known manner, such as by bolts, to the outer surface of one wall of a circular casing 12. An output shaft 14 extends from the motor 10 into the interior of the casing 12 where it is connected to a pinion gear 15 which is in engagement with a spur gear 16.

The spur gear 16 is circular in cross section and has a central opening which receives a shaft 18 which is coupled to the gear 16 in a conventional manner. Therefore, rotation of the output shaft 14 by the motor 10 causes corresponding rotation of the spur gear 16 and the shaft 18. A pinion gear 20 also extends around, and is coupled to, the shaft 18 in an axially-spaced relation to the spur gear 16. Another spur gear 22 is provided which is in engagement with the pinion gear 20. Therefore, the above-mentioned rotation of the shaft 18 causes rotation of the pinion gear 20 to drive the spur gear 22. It is understood that the gears 15, 16, 20 and 22 are supported for rotation in the casing 12 in any conventional manner and that the gears are designed such that the speed of the spur gear 22 is substantially reduced from the speed of the output shaft 14 of the motor 10, in a conventional manner.

The spur gear 22 has an enlarged central opening through which a mounting flange 23 extends. An inner race 24 is threadedly connected to the mounting flange 23 and a plurality of bolts 26 extend through aligned openings in the mounting flange and the gear 22 to couple the gear to the inner race.

A portion of the inner race 24 projects upwardly, as viewed in FIGS. 1 and 2, through an opening in the casing 12 and the inner and outer surfaces of the inner race 24 are stepped. A ring-shaped sprag clutch 28 extends around the mounting flange 23 and functions to permit rotation of the mounting flange, and therefore the inner race 24, in only one direction. Therefore, the above-described, relatively low-speed rotation of the spur gear 22 causes rotation of the mounting flange 23, and therefore the inner race 24, which rotation is permitted in one, predetermined direction by the sprag clutch 28.

The upper portion of a cylindrical driver 30, as viewed in FIG. 1, extends within the upper end portion of the inner race 24. The outer surface of the driver 30 and the inner surface of the inner race 24 are stepped and complementary so that the upper portion of the inner race receives the corresponding lower surface of the driver in a slightly spaced relation. Thus, the upper portion of the inner race 24 can rotate around the overlapped lower portion of the driver 30 under conditions to be described.

A wrap spring 34 normally extends around the outer surfaces of the driver 30 and the inner race 24 in a loose fit, and functions as a clutch. To this end, a tang 34a is formed on the lower portion of the wrap spring 34 and extends into a corresponding notch formed in the outer surface of the inner race 24. A control module 40, shown generally in FIGS. 1 and 2, is disposed in the upper end portion of the driver 30 and will be described in detail later. A tang 34b (FIG. 2) is formed on the upper end of the wrap spring and extends into a notch formed in a component of the control module 40. An outer race 41 extends over the mounting flange 23 and the inner race 24 and a cover 42 is mounted on the outer race and encases the control module 40, the driver 30, the wrap spring 34 and the inner race 24.

A manual locking device 43 is disposed between the cover 42 and an electrical switching device, such as a solenoid 44, in any known manner. The locking device 43 is adapted to actuate the control module 40 when the solenoid 44 is energized in a manner to be described.

The wrap spring 34, and therefore the control module 40 rotate with the inner race 24. When the solenoid 44 actuates the control module 40, and the control module latches to the stationary driver 30, all in a manner to be described, the upper end of the wrap spring 34 is thus restrained against movement, causing the wrap spring to tighten over the outer surfaces of the inner race 24 and the driver 30. This couples the inner race 24 to the driver 30 and thus transmits torque from the inner race to the driver, also in a manner to be described.

An output shaft 46 is disposed in the lower portion of the driver 30 in a coaxial relationship, extends through the inner race 24 and projects downwardly from the lower end of the inner race. A radially-extending set screw 48 extends through an opening in the driver 30 and engages the output shaft 46 to lock the shaft to the driver so that the shaft rotates with the driver.

A pinion 50 is disposed on the lower, projecting end portion of the output shaft 46 and engages a spur gear 52 which is connected to, and extends around the upper end portion of an elongated ball nut 54. The upper portion of the ball nut 54 extends in the casing 12 and the ball nut is mounted for rotation in a bearing assembly 56 located adjacent to an opening in the latter casing through which the ball nut projects. Therefore, when the rotating inner race 24 is coupled to the driver 30 by the wrap spring 34 as controlled by the solenoid 44 and the control module 40 in a manner to be described, the driver 30, and therefore the output shaft 46 and the pinion 50, rotate accordingly. This rotates the gear 52 causing corresponding rotation of the ball nut 54.

A helically grooved ball screw 60 is disposed in the ball nut 54 and the inner portion of the lower end portion of the ball nut 54 is provided with a helical groove that complements the groove in the ball screw 60 so as to receive a plurality of balls 62. As a result, rotation of the ball nut 54 causes corresponding axial movement of the ball screw 60 between a retracted position shown in FIG. 1 and by the solid lines in FIG. 2, and an extended position shown by the phantom lines in FIG. 2.

A head 64 is bolted to the lower portion of the casing 12 and a housing 66 is connected to, and extends downwardly from, the head and around the ball nut 54. A thrust bearing 68 extends in an area defined by a stepped portion of the head 64, the upper end portion of the housing 66, and a corresponding surface of the ball nut 54. A flange 54a extends radially outwardly from the lower portion of the ball nut 54 and engages the thrust bearing 68 in the retracted position of the ball screw, as shown.

The lower end portion 60a of the ball screw 60 is enlarged and is in threaded engagement with an adapter 70 that has a sleeve 70a extending in a radially-spaced relation to the ball nut 54 in the housing 66. Two elongated, diametrically opposed, slots 70b and 70c are provided in the sleeve 70a which respectively receive two radially extending set screws 74a and 74b extending through corresponding openings in the housing 66. As a result, rotation of the ball screw 60 with the ball nut 54 is prevented so that the ball screw will extend or retract axially relative to the ball nut when the nut is rotated.

The lower end of the adapter 70 abuts against a plate 75 that is connected to a spool sleeve 76 which, in turn, is connected to an upper spring plate 77. Central openings are formed through the adapter 70 and the plate 75 to permit a stem 78 to be connected to the lower end of the ball screw 60. To this end, a spring bolt 79 has a head portion 79a disposed in an enlarged opening in the lower end portion of the adapter 70 and a shaft portion 79b that extends through the opening in the plate 75 and into the upper end portion of the stem 78 and is connected to the stem in any known manner. The upper end of the stem 78 extends in a corresponding opening formed in the lower portion of the plate 75.

A lower spring plate 80 extends around the stem 78 and normally extends in a spaced relation to the plate 75, and a helical spring 82 extends between the upper spring plate 77 and the lower spring plate 80. The lower spring plate 80 is maintained in a stationary position by a packing retainer 84 that extends around the stem 78 and is secured to a bonnet 86. An outer cylindrical housing 88 extends from the head 64 to the bonnet 86, is mechanically connected to both, and encloses the lower portion of the ball nut 54 and its associated components. A plurality of shims 89 are mounted on the upper surface of the spring plate 80 and control the stroke length of the ball screw 60, as will be described.

The stem 78 reciprocates with the ball screw 60 and relative to the fixed lower spring plate 80, the packing retainer 84, and the bonnet 86. The stem 78 has an enlarged lower head portion 78a which projects from the lower surface of the bonnet 86 and which is adapted to be connected to a device, such as a gate valve 87, which is to be actuated by the assembly of the present invention. Thus, when the ball nut 54 is rotated and the ball screw 60 moves downwardly to its extended position shown by the phantom lines in FIG. 2, it causes corresponding downward movement of the adapter 70, the plate 75, the spool sleeve 76, the upper spring plate 77 and the stem 78. The spring 82 is thus compressed between the upper spring plate 77 and the fixed lower spring plate 80 and is adapted to return the ball screw 60 back to its retracted position in a manner to be described.

Figure 3A:
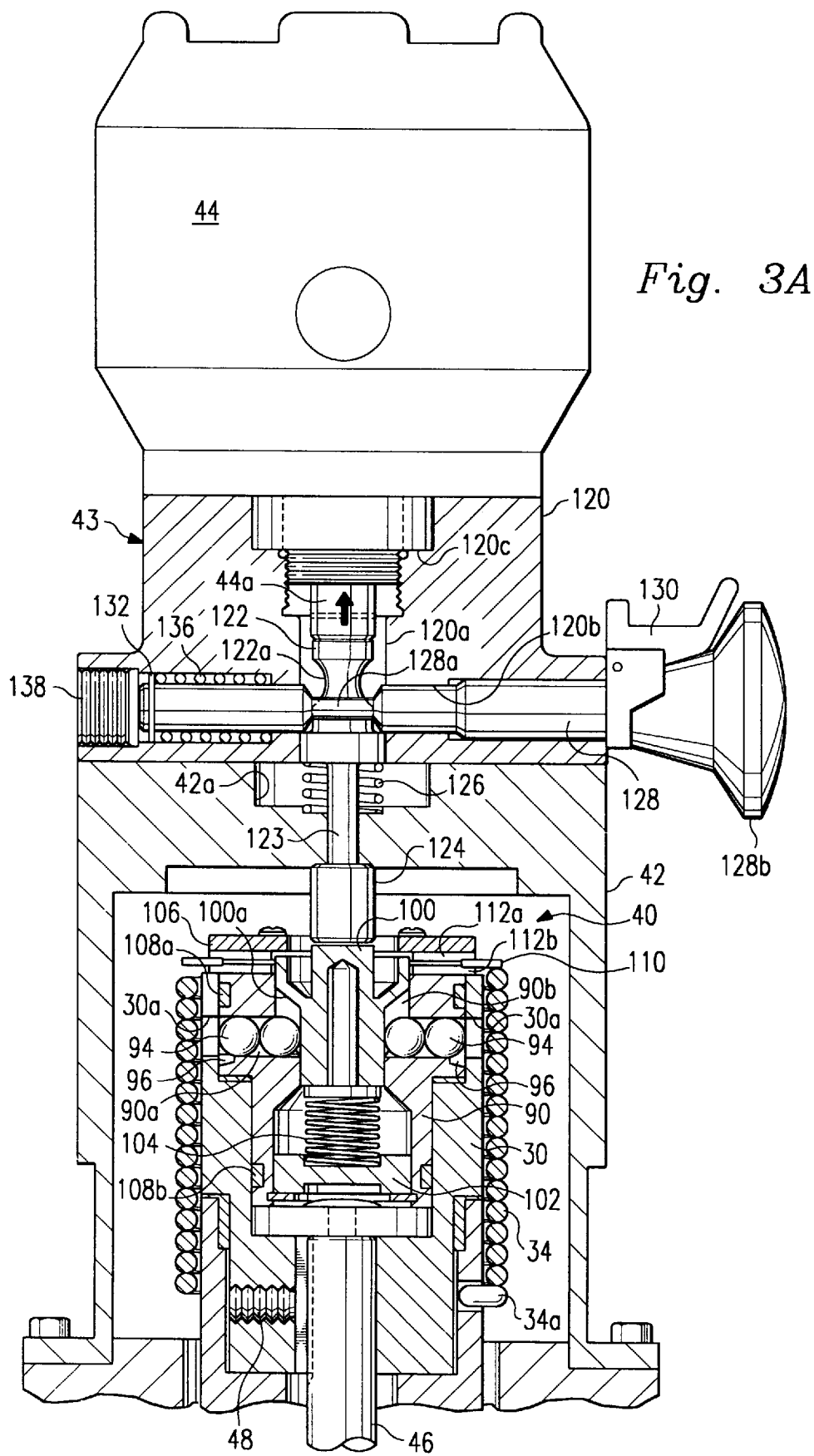
FIGS. 3A–3C are enlarged cross-sectional views of the control module and the locking device of FIGS. 1 and 2, showing different operational modes.

Details of the control module 40 are shown in FIG. 3A. More particularly, the module 40 includes a hub 90 having a stepped outer surface that nests within the stepped inner surface of the driver 30 in a slightly spaced relationship to the driver 30 to permit rotational movement of the hub relative to the driver. Six radially-extending, angularly-spaced, passages 90a are formed through the hub 90 all of which register with a central bore 90b also extending through the hub.

Two balls 94 are disposed in each of the passages 90a and are retained therein by a retaining ring 96 disposed in a groove formed in that portion of the hub 90 defining each passage 90a near the outer end of each passage. The retaining ring 96 projects slightly outwardly from its corresponding groove to normally retain the balls 94 in their respective passages. A plurality of openings, two of which are shown by the reference numeral 30a, are angularly spaced around the inner surface of the driver 30. Therefore, when the outer ball 94 in each passage 90a is forced past its corresponding retaining ring and into an opening 30a under conditions to be described, the control module 40 is latched to the driver 30.

A plunger 100 is disposed in the bore 92a and has a tapered outer surface 100a. A cup 102 is disposed in the lower portion of the inner race, as viewed in FIG. 3A, and a spring 104 extends between the lower end of the plunger 100 and the cup 102 to normally urge the plunger upwardly to the position shown in FIG. 3A. An annular cover disk 106 extends over the upper ends of the hub 90 and has a central opening that receives the upper end of the plunger 100. A notch (FIG. 2) is formed in the upper surface of the cover disk 106 which receives the tang 34b of the wrap spring 34, as discussed above.

A pair of axially-spaced wear rings 108a and 108b are provided through corresponding grooves formed in the outer surface of the hub 90, and a washer 110 extends between two pads 112a and 112b located just above the hub 90. The outer portion of the washer 110 projects outwardly from the driver 30 and retains the wrap spring 34 adjacent to the outer surfaces of the driver 30 and the inner race 24. (Although not clear in FIG. 2 due to limitations of scale, the tang 34b of the wrap spring 34 extends in a notch in the washer 110 of the control module 40.)

The details of the locking device 43 are also shown in FIG. 3A. More particularly, the device includes a housing 120 mounted between the solenoid 44 and the cover 42 and secured thereto in any known manner. An axial bore 120a extends through the housing 120 and receives, in its upper portion as viewed in FIG. 3A, an armature 44a of the solenoid 44. A transverse bore 120b is also provided through the housing 120 and is slightly offset from the bore 120a.

A plunger 122 is disposed in the bore 120a with its upper end in engagement with the lower end of the armature 44a. The plunger 122 has a reduced dimension, or necked-down, portion 122a and a stem 123 extends downwardly from the plunger and can be formed integrally with, or separately from, the plunger. The stem 123 extends through a bore 42a of the cover 42, and its lower end portion is in threaded engagement with an enlarged tip 124. In the retracted position of the armature 44a shown in FIG. 3A, the tip 124 extends just above the upper end of the plunger 100 of the control module 40. A spring 126 extends between an enlarged end portion of the plunger 122 and a ledge formed in the cover 42 and thus urges the plunger 122 upwardly against the armature 44a.

A stem 128 extends through the transverse bore 120b and has a central elongated, reduced dimension, or necked-down, portion 128a. One end portion (the right end portion as viewed in FIG. 3A) of the stem 128 projects out from the corresponding end of the bore 120b and has an enlarged head 128b affixed thereto. A lever 130 is pivotally mounted to the head 120b for locking the stem in an extended position for reasons to be described. The lever 130 is fusible, or meltable, at a predetermined elevated ambient temperature for reasons to be described, and is normally urged to its released position of FIG. 3A by a spring, or the like (not shown).

A washer 132 extends over the other end portion of the stem 128 and can be secured to the stem by a retaining ring, or the like. A spring 136 extends between the washer 132 and a ledge formed in the interior of the housing 120 and surrounding the bore 120b. As a result, the spring 136 urges the stem 128 in a direction from right-to-left to its retracted position, as viewed in FIG. 3A. A nut 138 extends in the other end portion of the bore 120b and is in threaded engagement with that portion of the housing 120 defining the latter end portion. As a result, the position of the nut 138 can be adjusted so as to vary the precise location of the stem in its retracted position of FIG. 3A. The control module 40, the locking device 43, and the solenoid 44 are all shown in their inactive mode in FIG. 3A.

Figure 3B:
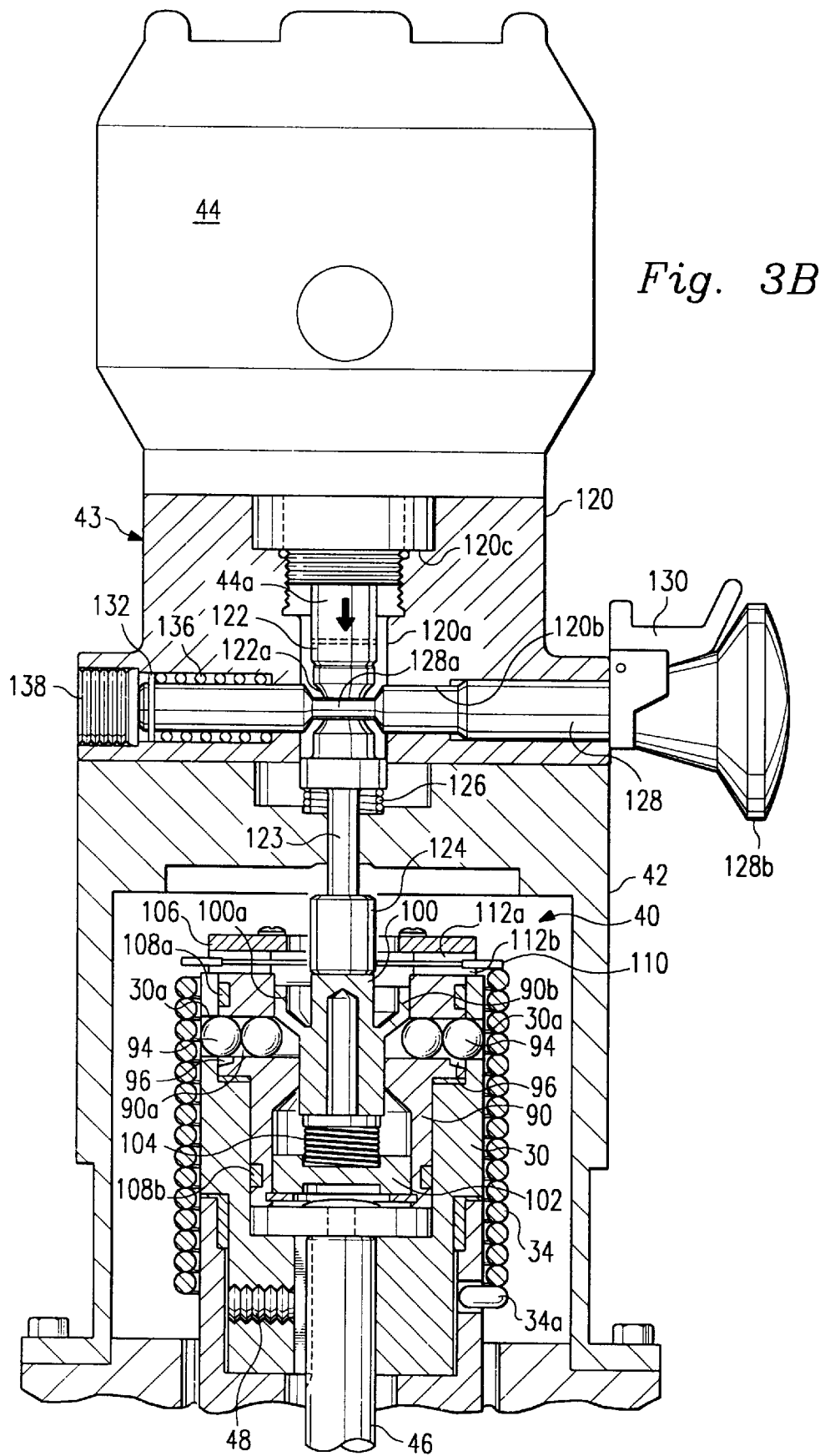

FIG. 3B depicts the armature 44a, the plunger 122 and therefore the stem 123 and the tip 124 in their lower position as a result of activation of the solenoid 44 and the resulting extension of the armature 44a. As a result of the resulting downward movement of the plunger 122, and therefore the stem 123 and the tip 124, the lower end of the tip engages, and pushes down, the plunger 100 of the control module 40. This causes the surface 100a of the plunger 100 to cam the balls 94 outwardly into their respective openings 30a. The resulting operation will be explained in further detail.

Figure 3C:
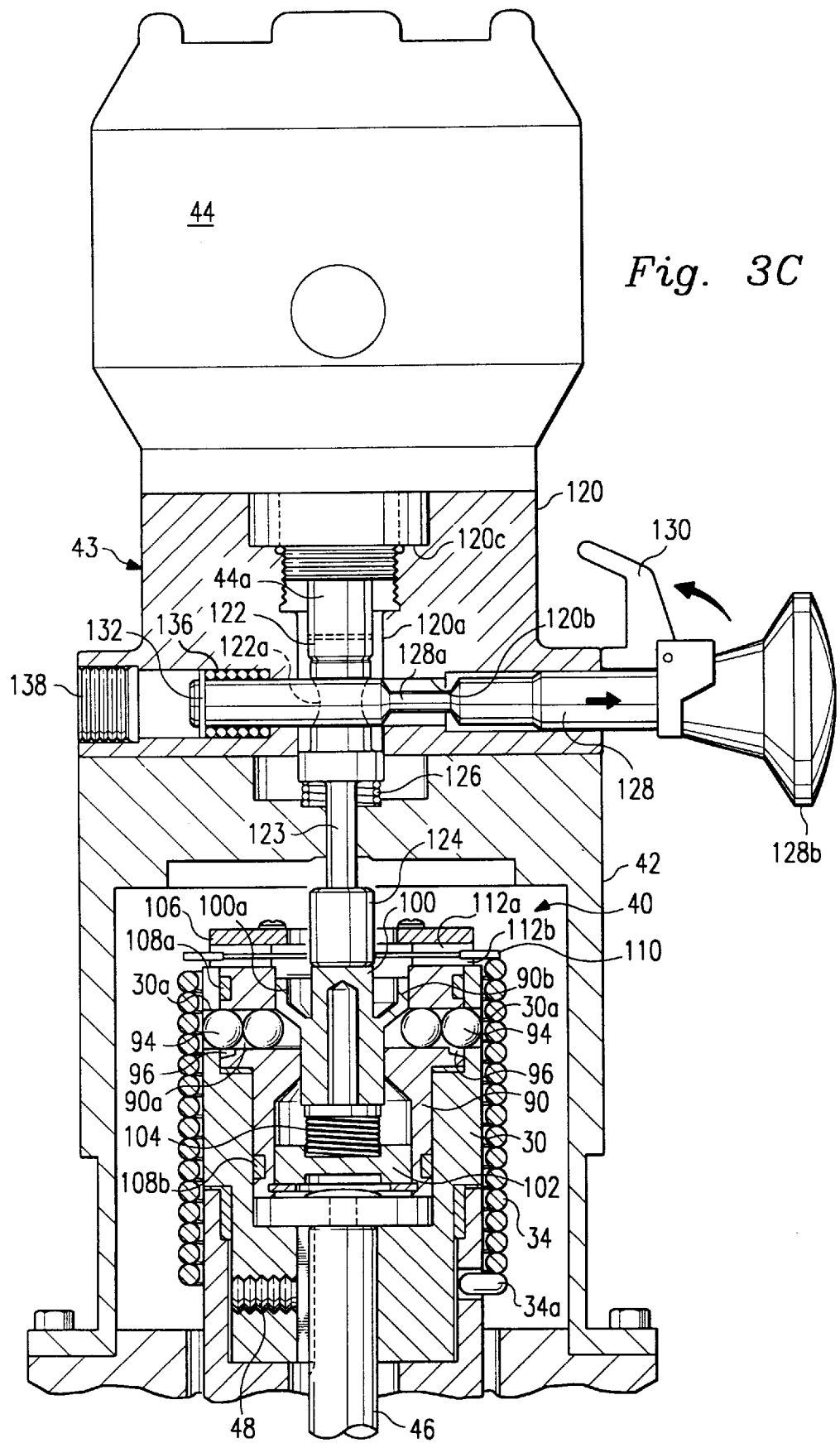

FIG. 3C is similar to FIG. 3B but depicts the stem 128 in its extended position as a result of manually pulling the head 128b of the stem in a direction from left-to-right as viewed in the drawing, against the force of the spring 136, and pivoting the lever 130 to the locked position shown. This secures the stem 128 in its extended position and locks the plunger 122 in its lower position, for reasons that will be described in detail.

The spatial relationship between the plunger 122 and the stem 128 is shown in FIGS. 4A, 4B, 5A, and 5B. More particularly, in the retracted position of the stem 128 shown in FIGS. 4A and 4B (as well as in FIGS. 3A and 3B) the reduced diameter portion 128a of the stem 128 aligns with the plunger 122, so that the plunger clears the stem thus permitting vertical translational movement of the plunger. In contrast, when the stem is moved to its extended position shown in FIGS. 5A and 5B (as well as in FIG. 3C), the regular-diameter portion of the stem 128 aligns with the necked-down portion 122a of the plunger 122 and thus blocks movement of the plunger. The significance of these unlocked and locked positions of the plunger 122 will be apparent from the following description of the operation of the actuator assembly of the present invention.

It will be assumed that the actuator assembly is oriented as shown in FIGS. 1 and 2, i.e., so that the ball screw 60 moves downwardly towards its extended position, and upwardly to its retracted position. It will also be assumed that the armature 44a of the solenoid is in its de-energized, retracted position of FIG. 3A; and the ball screw 60 is initially in its fully retracted position shown in FIG. 1 and by the solid lines in FIG. 2. To initiate the operation of the actuator assembly, the solenoid 44 is energized, causing its armature 44a to push the plunger 122 (FIG. 3A) of the locking device 43 downwardly against the force of the spring 126. The stem 123 moves downwardly with the plunger 122 and the tip 124 thus pushes the plunger 100 of the control module 40 downwardly against the force of the spring 104 to the position of FIG. 3B. Since the necked-down portion 128a of the stem 128 of the locking device 43 is aligned with the plunger 122 as shown in FIGS. 3A, 3B, 4A and 4B, the plunger 122 clears the stem 128 during its downward movement.

During the above-described downward movement of the plunger 100, the tapered surface 100a of the plunger engages the inner ball 94 in each passage 90a and forces the balls 94 radially outwardly, causing the outer ball in each passage 90a to be forced past its corresponding retaining ring 96 and into a corresponding opening 30a of the driver 30 as shown in FIG. 3B. This latches the control module 40 to the driver 30 and permits the wrap spring 34 to couple the inner race 24 to the driver 30 as will be described. The stem 128 remains in its retracted position of FIGS. 3A and 3B, and the plunger 100 is maintained in its lower position of FIG. 3B by the action of the armature 44a of the solenoid 44 acting through the plunger 122, the stem 123 and the tip 124 of the locking device 43.

The motor 10 (FIG. 1) is then turned on which drives its output shaft 14, the gear 16, and therefore the shaft 18, and the pinion 20. The pinion 20, in turn, drives the gear 22 and therefore the inner race 24, with the above-described gears and pinions reducing the rotational speed of the inner race when compared to that of the output shaft 14 of the motor 10. Since the tangs 34a and 34b of the wrap spring 34 are respectively connected to the inner race 24 and to the control module 40, this rotation of the inner race 24 causes rotation of the wrap spring 34 and therefore the control module 40. Since the balls 94 of the control module 40 are in engagement with the inner surface of the driver 30, this initial rotation of the control module 40 causes the wrap spring 34 to immediately tighten over the driver 30 and couples the inner race 24 to the driver in the manner described above. Therefore, the driver 30 and the shaft 46 also rotate at the same reduced speed.

The rotation of the shaft 46 causes corresponding rotation of the pinion 50, the gear 52, and the ball nut 54, causing the ball screw 60 to move axially from its retracted position shown in FIG. 1 to its fully extended, operative position shown by the phantom lines in FIG. 2. The plate 75, the stem 78, and the gate valve 87 also move with the ball screw 60 to its extended position until the plate 75 (FIG. 1) engages the shims 89 on the fixed lower spring plate 80 and spring 82 is compressed accordingly. The gate valve 87, or any other device connected to the stem 78, would be in its actuated position, which could be either opened or closed, depending on the particular design of the system.

In this fully extended, operative position of the ball screw 60, the motor 10 is turned off by a position sensor, a timer, or the like. The ball screw 60 is maintained in the latter position by the extended armature 44a of the solenoid 44 acting through the plunger 122, the stem 123, and the tip 124 of the locking device 43 to maintain the plunger 100 of control module 40 in its lower position which, in turn, maintains the connection between the inner race 24 and the driver 30. With the motor turned off, the sprag clutch 28 prevents back rotation of inner race 24, and therefore the gears 22, 20, 16 and 15, under the force of the compressed spring 82.

In the event it is desired to move the ball screw 60, the stem 78, and the gate valve 87 back to their retracted positions shown in FIG. 1 and by the solid lines in FIG. 2, or in the event of a power failure, the solenoid 44 is de-energized. This causes the armature 44a to retract and the plunger 122 of the locking device 43 to move upwardly by the force of the spring 126, with the plunger clearing the necked-down portion 128a of the stem 128. The stem 123 and the tip of the locking device also move upwardly and the tip 124 thus releases its engagement with the plunger 100 of the control module 40 which is thus forced upwardly by the spring 104 to its upper position shown in FIG. 3A. This permits the balls 94 of the control module 40 to disengage from the openings in the driver 30 and unlatch the control module from the driver. As a result, the wrap spring 34 is loosened and thus releases the coupling between the inner race 24 and the driver 30. The forces exerted by the compressed spring 82 on the upper spring plate 77, and therefore the plate 75, as well as any external forces, such as valve body pressure, or the like, acting on the stem 78, forces the ball screw 60 upwardly towards its retracted position shown in FIG. 1 and by the solid lines in FIG. 2. Since the driver 30 is decoupled from the inner race 24, this upward movement of the ball screw 60 causes rotation of the ball nut 54, the gear 52, the pinion 50, the output shaft 46, and the driver 30 in a direction that is opposite to the direction of rotation discussed above in connection with the extension of the ball screw 60. This retracting movement of the ball screw 60 continues until the ball screw reaches the fully retracted position shown in FIG. 1 and by the solid lines in FIG. 2, with the sprag clutch 28 preventing back rotation of the remaining gear train as discussed above. Thus, the stem 78, as well as any device connected to the stem, would also be moved back to its original positions.

The locking device 43 can lock and maintain the ball screw 60 in its fully extended position or in any position between its fully retracted and fully extended position, even if the solenoid 44 is de-energized. To this end, and assuming the armature 44a is in its extended position shown in FIG. 3B as well as the gate valve 87, would also be moved back to their stem 128, are manually pulled in a left-to-right direction as viewed to their extended, locking position shown in FIG. 3C. This places the stem 128 and the plunger 122 in the relative positions better shown in FIGS. 5A and 5B, with a regular-diameter portion of the stem 128 extending in the necked-down portion 122a of the plunger, thus blocking the plunger against any movement.

The lever 130 is then pivoted to the position shown in FIG. 3C where a portion of it extends between the head 128b and the corresponding portion of the housing 120 to maintain the stem 128 in its extended, locking position shown. Thus, even if the solenoid 44 is de-energized for whatever reason causing its armature 44 to retract to the position shown in FIG. 3A, the locking device 43 would still maintain the operative connection between the control module 40 and the driver 30, and therefore between the inner race 24 and the ball nut 54.

If it is desired to release the connection between the control module 40 and the driver 30, the stem 128 is extended, or moved, slightly in a left-to-right direction as viewed in FIG. 3C to release the lever 130 which is pivoted back to the position of FIGS. 3A and 3B under the action of the spring associated with the lever. This causes the stem 128 to move from right-to-left under the action of the spring 136 until the end of the stem engages the nut 138, as shown in FIG. 3B. The stem 128 would thus be back in the position shown in FIGS. 4A and 4B, thus permitting the plunger 100, and therefore the plunger 122, to move upwardly against the armature 44a of the solenoid 44 by the forces provided by the springs 104 and 126, respectively. As a result, the plungers 100 and 122 would move to their upper positions shown in FIG. 3A. This permits the balls 94 of the control module 40 to disengage from the openings in the driver 30 and unlatch the control module from the driver and therefore disconnect the ball nut 54 from the motor 10 and allow the ball screw 60 to retract, as described above.

In the event an elevated temperature condition occurs in the vicinity of the actuator assembly of the present invention when the ball screw 60 is locked in its extended postion by the locking device 43, as shown in FIG. 3C, the lever 130 would fuse, or melt. thus releasing the stem 128 and causing it to move from right-to-left to its retracted position. This permits the retraction movement of the ball screw 60 as described above in connection with the manual release of the stem 128.

The locking device and the actuator assembly of the present invention thus enjoy several advantages. For example, the locking device 43 enables the ball screw 60 to be easily and quickly locked in any extended position at any time without requiring it to be retracted and then extended and eliminates the need for removing the control module 40 and attaching a plug, or the like, that engages the control module. Also, the locking device 43 responds to elevated temperature conditions and permits release the ball screw from its extended position. Further, the control module 40 of the actuator assembly controls the large forces required to retract or extend the ball screw 60 with a device that latches the system in response to a holding signal that consumes a relatively low amount of power for a relatively long time. Further, the actuator assembly of the present invention, by virtue of the balls 94 of the control module engaging the holes 30a in the inner wall of the driver 30 at multiple, angularly-spaced locations, is stable and reliable and resists vibration and environmental factors which tend to "trip" the unit. Also, minimal gearing is provided between the control module 40 and the ball nut 54 to eliminate the possibility of multiple gears becoming jammed if a malfunction occurs. Further, the sprag clutch 28 prevents backward rotation of the gears 15, 16, 20 and 22 when the ball screw 60 is in its extended position, after the motor 10 has been turned off, and before the solenoid 44 has been de-energized. Also, the stem 78, the gate valve 87, the plate 75 and all components connected thereto, are separate from the ball screw 60 and the plate 70 which not only aids in manufacture and assembly, but insures that no torque from the rotating ball nut 54 will be applied to the stem 78 and the gate valve 87, connected thereto.

It is understood that other components, such as a mechanical override, a dampener system, and a torque limiter can be provided with the assembly of the present invention, but have not been shown or described in detail for the convenience of presentation.

It is also understood that variations may be made in the foregoing without departing from the scope of the present invention. For example, the locking device of the present invention is not limited to use with the actuator assembly disclosed above, or with any actuator assembly. AC motor 10 can be replaced by any alternative power source including, but not limited to, a DC motor, a hydraulic or pneumatic unit, or the like; and the solenoid can be replaced by any other type of electrical switching unit or a mechanical actuator. Also, the balls 94 in each passageway 90a can be replaced by a single elongated member.

Other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A locking device comprising a housing, an armature axially movable in the housing between a retracted and an extended position; a plunger mounted for axial movement in the housing in response to movement of the armature from the retracted position to the extended position; a stem movable in the housing between a first position in which it engages the plunger to lock the plunger, and therefore the armature, in the extended position, and a second position in which axial movement of the plunger, and therefore the armature, is permitted; and a lever adapted to engage the stem to maintain it in its first position, the lever being meltable in response to a predetermined ambient temperature to permit release of the stem and movement of the stem to the second position.

2. The locking device of claim 1 wherein the armature, in its extended position, is adapted to actuate a control module having an axially movable plunger, the plunger extending between the armature and the plunger of the control module so that movement of the armature to its extended position moves the plunger of the control module accordingly and actuates the control module.

3. An actuator assembly for moving a device between a retracted and extended position, the assembly comprising a nut member, a ball screw adapted to be connected to the device, the ball screw being in threaded engagement with the nut member and movable between a retracted and an extended position upon rotation of the nut member, a member for producing torque, a drive assembly adapted to be operatively connected between the torque producing member and the nut member for transferring the torque therebetween to rotate the nut member, and a control system for selectively connecting the drive assembly between the torque producing member and the nut member, the control system comprising an electrical switching device having an armature that moves in response to an input signal, an inner race operatively connected to one of the members, a driver operatively connected to the other member, a wrap spring extending around a portion of the inner race and a portion of the driver, a control module having a plunger which, when moved to a predetermined position, causes the control module to latch to the driver, a locking device having a plunger extending between the armature and the plunger of the control module so that movement of the armature causes corresponding movement of the plungers of the locking device and the control module, the wrap spring being connected to the inner race and to the control module so that, upon actuation of the torque producing member, the inner race, and therefore the wrap spring and the control module, rotate relative to the driver, and, in response to application of the input signal, the control module latches to the driver to tighten the wrap spring around the inner race and the driver to couple the inner race to the driver and transfer the torque from the torque producing member to the nut member to rotate the nut member, the locking device further comprising a stem adapted to be manually moved into engagement with the plunger of the locking device to maintain the plunger of the locking device, and therefore the plunger of the control module in the predetermined position and the control module latched to the driver upon removal of the input signal.

4. The assembly of claim 3 wherein the driver has a bore and wherein the control module extends within the bore and rotates in the bore before application of the input signal.

5. The assembly of claim 4 wherein the control module further comprises at least one latching member, and wherein the movement of the plunger of the control module urges the latching member into engagement with the inner wall of the driver to latch the control module to the driver and therefore tighten the wrap spring around the inner race and the driver to connect the drive assembly between the torque producing member and the nut member.

6. The assembly of claim 5 wherein there are a plurality of latching members in the form of balls, and wherein a plurality of angularly spaced openings are formed in the inner surface of the driver for receiving the balls to latch the control module to the driver.

7. The assembly of claim 3 wherein the plunger of the locking device has a reduced dimension portion and the stem has a reduced dimension portion and a regular dimension portion, the stem being movable to a first position in which its reduced dimension portion aligns with the reduced dimension portion of the plunger to permit movement of the plunger, and therefore the armature, in response to the input signal, the stem being movable to a second position in which its regular dimension portion aligns with the necked-down portion of the plunger so that the regular dimension portion of the plunger overlaps, and is blocked by, the corresponding regular-dimension of the stem to lock the plunger, and therefore the plunger of the control module, in the predetermined latched position.

8. The assembly of claim 7, wherein the armature of the electrical switching device moves from a retracted position to an extended position in response to the input signal, and wherein the plunger of the locking device moves the plunger of the control module in response to the extension of the armature.

9. The assembly of claim 8 further comprising a spring engaging the plunger of the locking device for moving the latter plunger towards the armature when the armature moves from its extended position to its retracted position.

10. The assembly of claim 3 wherein the power source has an output shaft and wherein the drive assembly comprises a plurality of gears connecting the output shaft to the inner race.

11. The assembly of claim 3 further comprising a drive shaft connected to the driver, and a gear connecting the drive shaft to the nut member for rotating the nut member in response to rotation of the driver and therefore the drive shaft.

12. The assembly of claim 3 wherein the inner race is connected to the torque producing member and the driver is connected to the nut member.

13. The assembly of claim 3 further comprising a lever adapted to engage the stem to maintain it in engagement with the plunger of the locking device, the lever being meltable in response to a predetermined ambient temperature to permit release of the stem from the engagement.

14. The assembly of claim 3 wherein the device is a gate valve.

15. A locking device for locking a movable member in a predetermined position, the locking device comprising a housing; a plunger mounted for axial movement in the housing in response to movement of the member, a stem movable in the housing between a first position in which it engages the plunger to lock the plunger, and therefore the member, in the predetermined position, and a second position in which axial movement of the plunger, and therefore the member, is permitted; a lever adapted to engage the stem to maintain it in its first position, the lever being meltable in response to a predetermined ambient temperature to permit release of the stem and movement of the stem to the second position; and a spring disposed in the housing and engaging the plunger for moving the plunger with the member when the member moves from its extended position to its retracted position.

16. A locking device for locking a movable member in a predetermined position, the locking device comprising a housing; a plunger having a reduced dimension portion and a regular dimension portion and being mounted for axial movement in the housing in response to movement of the member; a stem having a reduced dimension portion and a regular dimension portion and being movable in the housing between a first position in which it engages the plunger to lock the plunger, and therefore the member, in the predetermined position, and a second position in which axial movement of the plunger, and therefore the member, is permitted; and a lever adapted to engage the stem to maintain it in its first position, the lever being meltable in response to a predetermined ambient temperature to permit release of the stem and movement of the stem to the second position; wherein, in the first position of the stem, its regular dimension portion aligns with the reduced dimension portion of the plunger so that the regular dimension portion of the plunger overlaps, and is blocked by, the corresponding regular dimension portion of the stem; and wherein, in the second position of the stem, its reduced dimension portion aligns with the reduced dimension portion of the plunger to permit the movement of the plunger.

* * * * *